United States Patent [19]

Sampayan

[11] Patent Number: 5,723,954
[45] Date of Patent: Mar. 3, 1998

[54] PULSED HYBRID FIELD EMITTER

[75] Inventor: Stephen E. Sampayan, Manteca, Calif.

[73] Assignee: The Regents of the University of California, Oakland, Calif.

[21] Appl. No.: 422,094

[22] Filed: Apr. 14, 1995

[51] Int. Cl.⁶ .................................................. H01J 11/04
[52] U.S. Cl. ............................. 315/326; 313/495; 257/10
[58] Field of Search ......................................... 315/326, 344; 313/495; 257/10, 77

[56] References Cited

U.S. PATENT DOCUMENTS

| | | | |
|---|---|---|---|
| 5,285,129 | 2/1994 | Takeka et al. | 313/346 R |
| 5,341,063 | 8/1994 | Kumar | 257/10 |

FOREIGN PATENT DOCUMENTS 9219005  10/1992  WIPO .

*Primary Examiner*—Robert Pascal
*Assistant Examiner*—Michael Shingleton
*Attorney, Agent, or Firm*—Henry P. Sartorio; John P. Wooldridge

[57] ABSTRACT

A hybrid emitter exploits the electric field created by a rapidly depoled ferroelectric material. Combining the emission properties of a planar thin film diamond emitter with a ferroelectric alleviates the present technological problems associated with both types of emitters and provides a robust, extremely long life, high current density cathode of the type required by emerging microwave power generation, accelerator technology and display applications. This new hybrid emitter is easy to fabricate and not susceptible to the same failures which plague microstructure field emitter technology. Local electrode geometries and electric field are determined independently from those for optimum transport and brightness preservation. Due to the large amount of surface charge created on the ferroelectric, the emitted electrons have significant energy, thus eliminating the requirement for specialized phosphors in emissive flat-panel displays.

18 Claims, 5 Drawing Sheets

5,723,954

PULSED HYBRID FIELD EMITTER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to devices that produce electron emission, and more specifically, it relates to a hybrid emitter technology that exploits the electric field created by a rapidly depoled ferroelectric material, and combines the emission properties of a planar thin film emitter with a ferroelectric to provide enhanced electron emission.

2. Description of Related Art

Rugged, long life, high current and high brightness electron beam sources are required for numerous accelerator, high power microwave source and display applications. Diamond, carbide and semiconductor field emitters can be selected but presently require complex microstructures to operate since a sufficiently high electric field is required for the emission to take place; cost, reliability, and constant emission properties are still very serious issues. Diamond in the (111) crystal orientation can be used because of the low minimum field of about 100 kV/cm at which field emission takes place; low cost, large area systems do not appear probable in the near term. Ferroelectrics have been proven to be high brightness and high current emitters but can sometimes have bulk breakdown problems because of the generally low dielectric strength and high dielectric constant of the material in conjunction with the required grid structures.

Interest in diamond, carbide and semiconductor emitters has increased significantly over the past several years. Microwave tubes and emissive flat panel displays are the many commercial applications for these devices. This class of emitter essentially relies on the field emission process which requires sufficiently high electric fields local to the surface for the strong emission to take place. As stated earlier, for diamond in the preferred (111) direction, local electric fields on the order of about 100 kV/cm are required. Significantly higher fields (>1 MV/cm), however, are necessary for the more easily fabricated diamond emitters not in this orientation and in general for other types of field emitters.

Thus, to allow the use of the more easily fabricated emitters at reasonable anode-cathode (A-K) potentials requires enhancement of the local electric field. Experimenters have used microfabrication techniques to generate high aspect ratio, atomically sharpened points, to enhance this local electric field. Characteristic dimensions of the tips range from angstroms to a few microns in diameter. Among the many fabrication techniques being developed are growth from a properly oriented "seed" diamond on a substrate, deposition of a thin diamond layer on an already fabricated silicon substrate, or use of complex three-dimensional fabrication techniques which are now becoming more widely practiced in the semiconductor industry.

The geometry of these structures, however, make them inherently susceptible to mechanical damage from physical shock, arcing, ion bombardment, or joule heating, which can lead to material ablation. These effects cause rounding of the emitter tip or exposure of sub-surface impurities. Further, in time, fractures along crystal planes can occur resulting in multiple tip formation at each fabricated emitter site. The net of these effects are significant changes in the emission properties over time. In addition, with semiconductive emitter materials, coating of the local insulator microstructures supporting grid electrodes can occur also resulting in modified emission characteristics.

Another technology used for the creation of an electron beam uses ferroelectric emission. Ferroelectric materials have the unique property of spontaneous polarization along a particular axis (called the polarization axis). The material remains neutral internally as the end of each dipole is paired along that polarization axis. At any boundary with a normal component to this axis, the dipoles are unpaired and a material dependent spontaneous bound charge will exist. As a consequence of this abnormally high energy state, free screening charges form to neutralize the surface.

To induce emission from the ferroelectric surface, the polarization is rapidly switched. This switching leaves the surfaces uncompensated again so that for the material to regain neutrality, either charge must be released through emission, through some conduction means in the vicinity, or through the bulk of the material.

The mechanism responsible for the creation of the emitted charges has not as yet been unambiguously identified. The popular view of the process is that ferroelectric emission results from the expulsion of the free screening charge from the material's surface upon inversion of the internal polarization. Another possibility is that ferroelectric emission is actually a field emission process where an extremely large electric field, already known to exist, generated by the spontaneous bound charge, is caused to exist across a very thin non-ferroelectric layer on the surface.

Emission from a ferroelectric can yield extremely large pulsed currents. The primary reason is that switching can be induced very rapidly in certain materials so that expulsion of charge from the surface is the dominant mechanism for regaining neutrality and not conduction in the vicinity of or conduction through the material. For instance, ceramics such as Lead-Titanate-Zirconate (PZT) or Lead-Lanthanum-Titanate-Zirconate (PLZT) can be switched very rapidly (10's of ns) compared to any characteristic diffusion or relaxation times. Further, these new materials can have an extremely high spontaneous bound charge (up to 100 $C/cm^2$). Thus, upon polarization switching, strong emission occurs (>100 $A/cm^2$) by either of the two mechanisms suggested earlier.

The breakdown field of these ferroelectric materials, however, is quite low (of order 30 kV/cm of applied E). This low breakdown field, the enhancement caused by the discontinuity of the high permittivity ferroelectric material the low permittivity vacuum region and the sharp edge of the grid structure (of order 1 mm thick) make the emitter susceptible to breakdown near this grid. Further, any voids between the grid (typically 100 mm wide) and the ferroelectric (dielectric constant of order 1000) tend to enhance the electric field and again, can become a site of eventual failure.

An ideal structure should be planar and in the case of a diamond emitter configuration should be a thin single crystalline planar structure oriented to the <111> crystal plane. Fabrication of such a diamond structure on a reasonable scale, however, has not been possible. By contrast, an amorphic diamond planar structure with a sufficiently high electric field is possible but would require high electric fields for the field emission processes. High fields, however, make the device susceptible to electric breakdowns to electrodes in the vicinity of the emitter.

SUMMARY OF THE INVENTION

It is an object of the present invention to provide emission from pulsed hybrid diamond, carbide and semiconductor emitters.

The invention is a hybrid emitter technology which exploits the electric field created by a rapidly switched ferroelectric material with the negative electron affinity offered by a diamond or similar surface. Combining the emission properties of a planar thin film emitter (comprising e.g. diamond) with a ferroelectric alleviates the technological problems associated with both types of emitters and provides robust, extremely long life, high current density cathodes of the type required by emerging microwave power generation, accelerator technology, and display applications.

The invention utilizes a multilayer emitter composed of a ferroelectric substrate and overlaid with a thin, strong field emission material, and exploits the use of the significant spontaneous surface charge and the electric field created by a rapidly switched ferroelectric material. Emitter materials usable in accordance with this invention exhibit strong electron emission, or have negative electron affinity at low to moderate potentials. Generally, for an electron to leave the surface of a solid, it must overcome a potential barrier at the surface. If a sufficiently strong electric field is applied near the surface, the potential barrier becomes modified which allows electrons to be accelerated into the vacuum gap under the influence of this applied electric field.

Field emission can be induced in many materials. Some materials are elemental, some are compounds, some are mixtures, others are synthetic and specifically engineered so as to minimize the required electric field at which electron emission occurs. For instance, it is well known that natural and synthetic diamond, specifically oriented in the <111> crystal plane, is probably one of the most unique in that emission occurs at the very low electric field stated earlier. The material is presently the only known stable material which exhibits this property. It has also been found that the application of particular metals such as titanium to the diamond surface enhances the emission effect even further. Other modifications can be made to the diamond which render it semiconductive so as to allow the transport of electrons to the surface more easily. Other materials which exhibit similar effects include carbides and semiconductors. The key prerequisite of the emitter material in this application is that the axial electric field produced by the ferroelectric material exceed the field required for emission in the thin-film field emitter deposited on the ferroelectric surface.

Combining the emission properties of a planar thin film diamond, carbide or semiconductor emitter with a ferroelectric alleviates present technological problems with both types of emitters. Diamond films have at least a one to two orders of magnitude greater breakdown field than a ferroelectric. Further, as the dielectric constant of diamond is much lower, the enhancement at the emitter-vacuum-grid interface is much lower and the effect of the imperfections at the grid-emitter interface is reduced. Thus the application of this layer greatly enhances the long term reliability associated with the ferroelectric grid structure.

As the mobile screening charges are injected by the ferroelectric at the interface, conductivity of a diamond thin film emitter is increased. As this increased conductivity begins at the interface and propagates toward the grid, the electric field is further enhanced nearer to the surface. This effect further stimulates emission; however, this condition by itself is not necessary for emission to take place. The geometry of this invention places the electric field stress in close proximity to the surface and into a carefully controllable thin film where theoretical breakdown of a solid can be approached. Thus, extraction potentials are defined by the required acceleration and transport and not the enhancement factor and fields required for emission. Reliability is enhanced since the mean field in the anode-cathode (A-K) gap is kept low. Further, planar surfaces are used, eliminating complex and fragile structures which are generally susceptible to aging processes and failure.

DETAILED DESCRIPTION OF THE INVENTION

Figure 1:
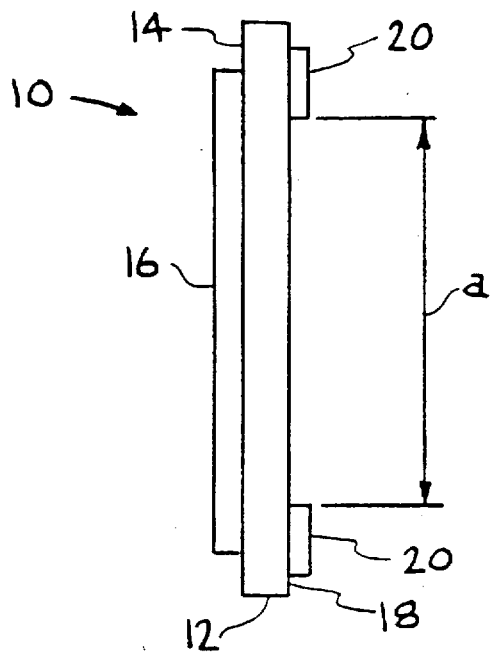
FIG. 1 shows a prior art ferroelectric emitter.

The invention exploits the use of the significant spontaneous surface charge and the electric field created by a rapidly switched ferroelectric material and utilizes a multilayer emitter composed of a ferroelectric substrate and overlaid with a thin, strong field emission material such as chemical vapor deposition (CVD) diamond, carbide or semiconductor. Emitter materials usable in accordance with this invention exhibit strong electron emission (greater than or equal to greater than 100 mA/cm$^2$ ), or have negative electron affinity at low to moderate potentials (50 kV/cm to greater than 500 kV/cm).

Generally, for an electron to leave the surface of a solid, it must overcome a potential barrier at the surface. One method used to overcome this barrier is to apply an electric field near the surface. If the field is sufficiently strong, the potential barrier becomes modified which allows electrons to be accelerated into the vacuum gap under the influence of this applied electric field. This is the field emission effect.

Field emission can be induced in many materials. Some materials are elemental, some are compounds, some are mixtures, others are synthetic and specifically engineered to minimize the required electric field at which electron emission occurs. For instance, it is well known that natural and synthetic diamond, specifically oriented in the <111> crystal plane, is probably one of the most unique in that emission occurs within the range of electric fields stated above. The material is presently the only known stable material which exhibits this property. It has also been found that the application of particular metals such as titanium to the diamond surface enhances the emission effect even further. Other modifications can be made to the diamond which render it semiconductive so as to allow the transport of electrons to the surface more easily. Other materials which exhibit similar effects include carbides, as an example, ZrC, HfC, and SiC. Others include semiconductors such as doped Si.

In operating the hybrid emitter, the axial electric field produced by the ferroelectric material must exceed the field required for emission in the thin-film field emitter deposited on the ferroelectric surface. Diamond films have at least a one to two orders of magnitude greater breakdown field than a ferroelectric. Further, as the dielectric constant of diamond is much lower, the enhancement at the emitter-vacuum-grid interface is much lower and the effect of the imperfections at the grid-emitter interface is reduced. Thus the application of this layer greatly enhances the long term reliability associated with the ferroelectric grid structure.

Emission from a diamond film requires a strong electric field in the vicinity of the surface. As ferroelectric materials can generate a very significant surface charge density upon reversal of the internal polarization, a strong electric field will also be generated. For example, typical spontaneous polarization surface charge densities are of order 100 mC/cm$^2$. Using more conservative known experimental values, however, for a PZT ceramic of 6 μC/cm$^2$, suggests an electric field exceeding 10 MV/cm. Because of the proximity of the grid structure and the permittivity of the vacuum region, a sufficient field in the diamond layer and in close proximity to the surface in the vacuum region will result. Thus, conditions for field emission for diamond, most carbide, and semiconductor materials are possible.

As the mobile screening charges are injected by the ferroelectric at the interface, conductivity of a diamond thin film emitter is increased. As this increased conductivity begins at the interface and propagates toward the grid, the electric field is further enhanced nearer to the surface. This effect further stimulates emission; however, this condition by itself is not necessary for emission to take place.

In this invention, the electric field stress is placed in close proximity to the surface and into a carefully controllable thin film, where theoretical breakdown of a solid (>10 MV/cm) can be approached. Thus, extraction potentials are defined by the required acceleration and transport and not the enhancement factor and fields required for emission. Reliability is enhanced since the mean field in the A-K gap is kept low. Further, planar surfaces are used, eliminating complex and fragile structures which are generally susceptible to aging processes and failure.

The operation of the hybrid emitter can be understood by first considering the effect of the exit electrode 20 shown in the prior art ferroelectric emitter of FIG. 1. A standard ferroelectric emitter 10 comprises a ferroelectric emitter material 12 and has an input face 14 with an input electrode 16 and an exit face 18 with exit electrodes 20. A single aperture in the exit electrode 20 with radius "a" defines the local potential and therefore the electric field according to well known electromagnetic theories. Such theories allow estimation of the spatial dependence of the potential in the vicinity of the aperture assuming a known charge which has been determined experimentally. Although only a single aperture (circular) has been described, in part for simplicity, the technique is applicable to multi-apertures and apertures of different shape.

Figure 2:
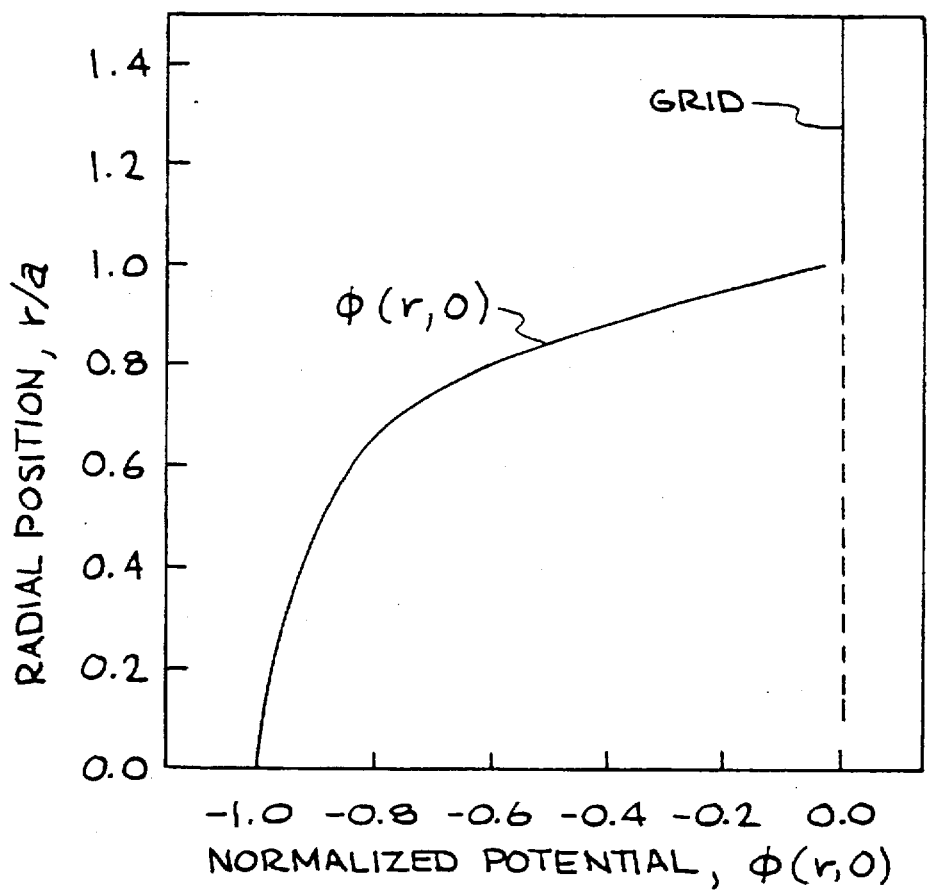
FIG. 2 shows the dependence of potential on radial position.

The spatial dependence of potential is found to have an approximate functional form as described graphically in FIG. 2. This graphical representation has been made generally applicable to different size apertures by scaling the radial position to the aperture radius "a" and scaling the potential to a value proportional to sa/e, where s is measured surface charge and e is the permittivity local to the aperture. Recognizing that this potential exists and that the electric field is of extremely large magnitude forms the basis of the hybrid emitter.

Figure 3A:
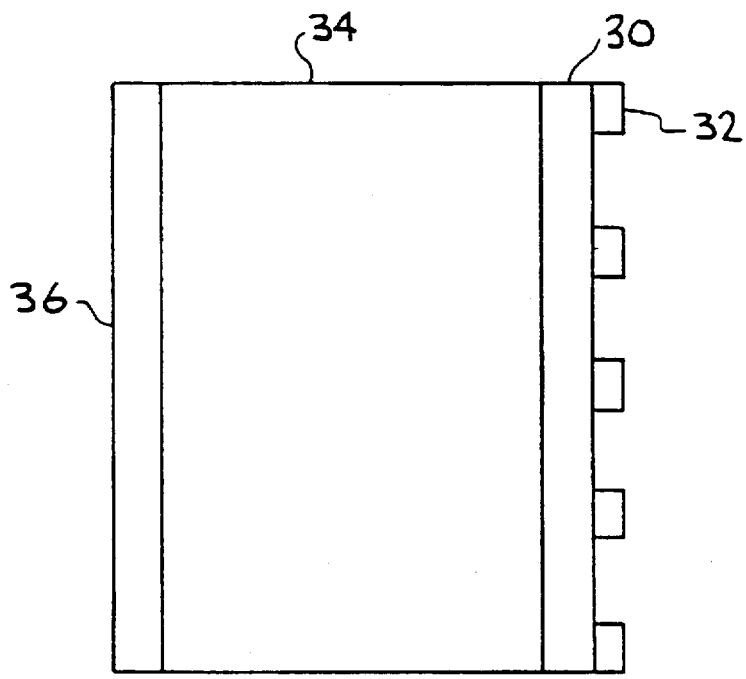
FIG. 3A shows an emitter comprising an electronegative film deposited between the ferroelectric and the grid.
Figure 3B:
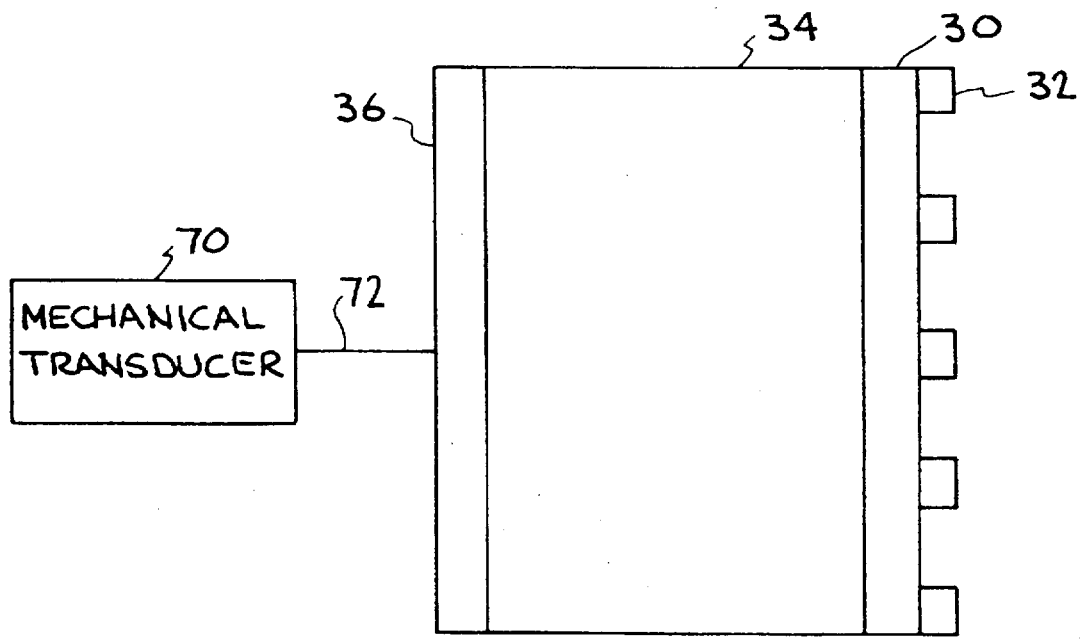
FIG. 3B shows means for mechanically switching the emitter of FIG. 3A.
Figure 3C:
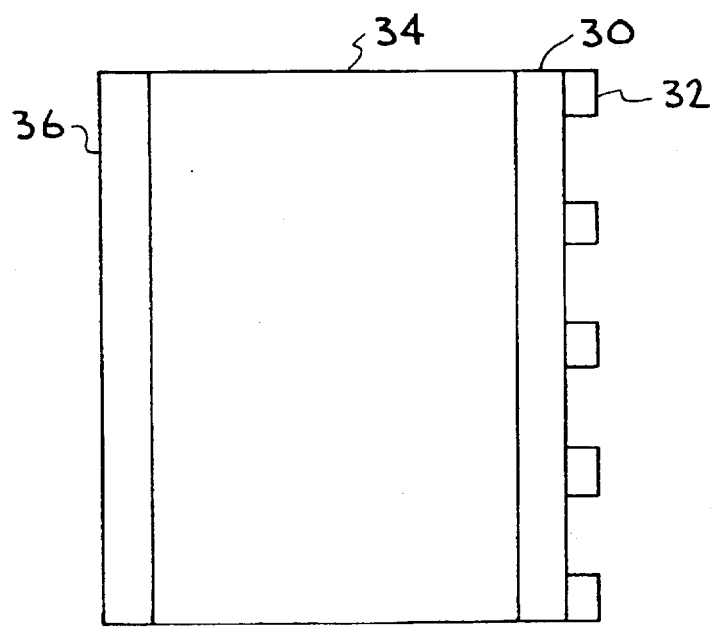
FIG. 3C shows means for thermally switching the emitter of FIG. 3A.
Figure 3D:
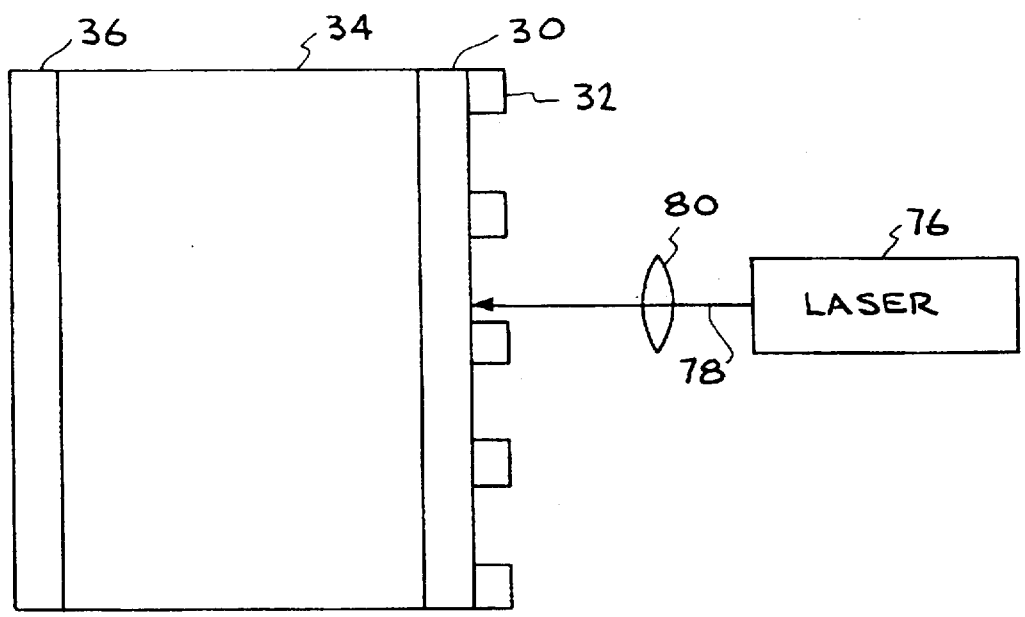
FIG. 3D shows means for optically switching the emitter of FIG. 3A.
Figure 3E:
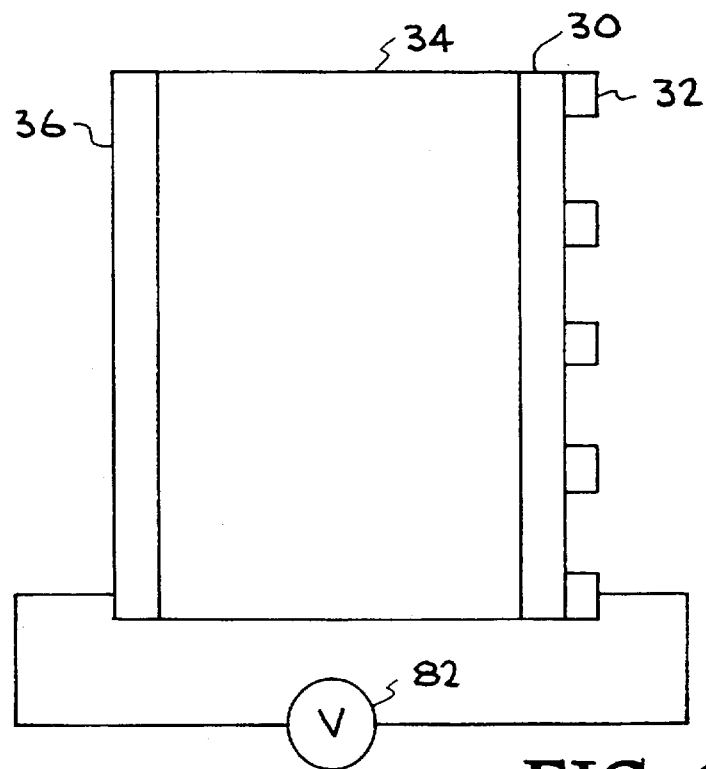
FIG. 3E shows means for electrically switching the emitter of FIG. 3A.
Figure 4:
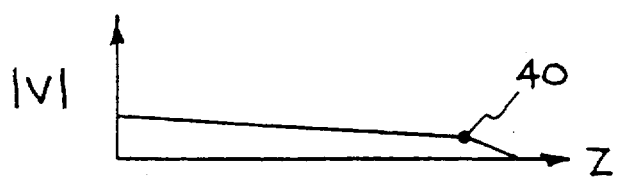
FIG. 4 shows the potential across the emitter of FIG. 3.

Consider the structure of FIG. 3A, where an electronegative emitter film material 30, such as diamond, is deposited between the grid or exit electrode 32 and the ferroelectric 34. Such materials are known to emit copious quantities of electrons when subjected to sufficiently high electric fields. Electronegative emitter film material 30 is made sufficiently thin to optimize its emission properties, and so that the potential defined in the layer by the ferroelectric 34 is not decreased to the point below a critical level at which emission occurs. In the initial state, a potential applied across the input electrode 36 and exit electrode 32 will divide in the ferroelectric and emitter material, as shown at point 40 in FIG. 4. FIG. 3B shows means for mechanically switching the emitter of FIG. 3A. A mechanical transducer 70 either with a coupling means 72 or in contact with input electrode 36 or ferroelectric 34 is useful for mechanically switching the emitter. FIG. 3C shows the use of a heater and cooler system 74 for thermally switching the emitter of FIG. 3A. Heater and cooler system 74 may be positioned at any location around the emitter, but optimally, it will be positioned adjacent to the output electrode 32. FIG. 3D shows the use of a laser or other illumination source 76 which produces a beam 78 that is focused or diverged by lens 80 for optically switching the emitter of FIG. 3A. FIG. 3E shows the use of a voltage source 82 for electrically switching the emitter of FIG. 3A. In this representation, only the potential near the center of the aperture is being considered. The absolute value of voltage |V| is shown as a function of position Z in the emitter. The potential across the aperture will vary approximately as previously described in FIG. 2.

Figure 5:
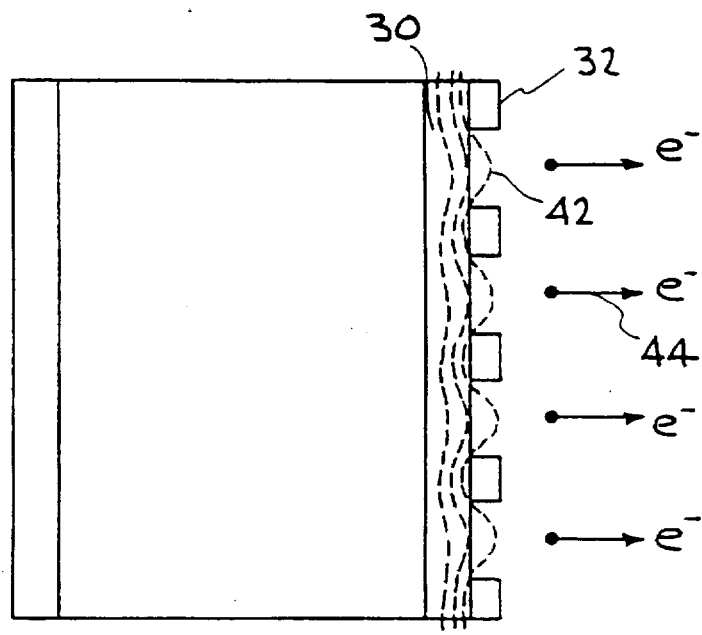
FIG. 5 depicts field emission from a hybrid emitter.

Referring to FIG. 5, because of the effect of the grid 32, the discontinuity at the interface into the vacuum gap, and the anode electrode (not shown) beyond the emitter 30, equipotential lines 42 extend into the gap and contribute to the overall process. Provided the electric fields defined by these equipotentials in and around the materials are sufficiently large, field emission 44 occurs from the emitter surface.

Switching the ferroelectric is the process whereby a change in the net material polarization is induced by an external influence. The ferroelectric material can be switched mechanically, thermally, optically and electrically. Mechanical switching can be accomplished by, i.e., placing an acoustic source or similar source such as a transducer in contact with the ferroelectric material. Similarly, any mechanical distortion of the ferroelectric itself will switch the material. An induced temperature change, i.e., heating or cooling the material across a phase boundary or heating the ferroelectric material from a low temperature to the Curie temperature will switch the material. Applying optical energy to the face of the ferroelectric of sufficient fluence by a laser or similar source will switch the material. A sufficiently high electric field applied to the ferroelectric material will also switch the material.

Figure 6:
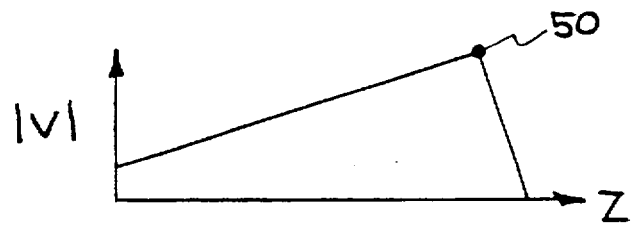
FIG. 6 shows the dependence of the potential of an electric field on the thickness of the film.

As shown in FIG. 6 at point 50, when the field established in the ferroelectric is large enough to initiate switching of the ferroelectric, a large bound charge is induced at the ferroelectric/emitter interface, and a potential dependent on the induced charge and capacitance between the input and exit electrodes will be established. The potential described in FIG. 6 defines an electric field approximately proportional to 1/t, where t is the thickness of the film. Again, in this representation, only the approximate potential near the center of the aperture is being considered. The potential across the aperture will vary approximately as previously described in FIG. 2.

The thickness of the ferroelectric substrate may be defined by the geometry of the entrance electrode and at least one material characteristic such as ferroelectric material polarization, ferroelectric material permittivity, ferroelectric material electrical breakdown threshold, field emitter permittivity, field emitter emission threshold and field emitter breakdown threshold. Alternately, the ferroelectric substrate thickness may be defined by the geometry of the exit electrode and at least one of the material characteristics described above. The field emitter thickness may be defined by the geometry of the entrance electrode and at least one of the material characteristics described above. Alternately, the field emitter thickness may be defined by the geometry of the exit electrode and at least one of the material characteristics described above.

Figure 7:
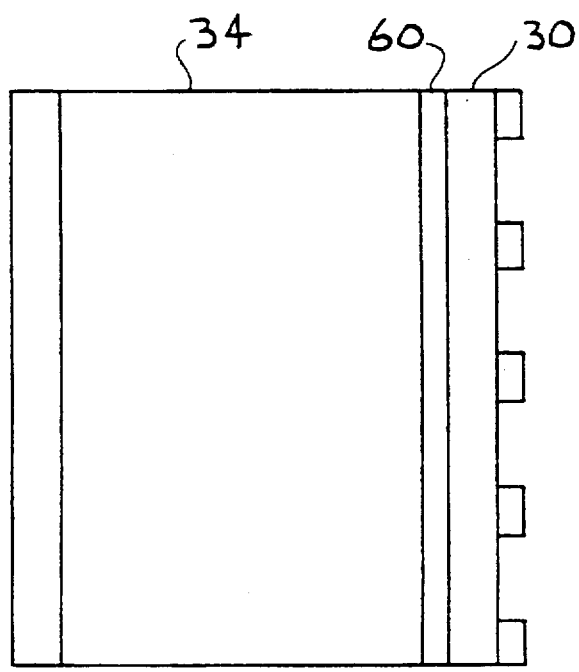
FIG. 7 shows a hybrid emitter with an intermediate exit electrode.

The applications of the device include long life cathodes for microwave tubes, accelerator, switching and emissive flat-panel display applications. In addition, diamond has the characteristic of very short carrier lifetime (of order 100 ps). FIG. 7 shows an intermediate electrode 60 between ferroelectric substrate 34 and emitter 30. This intermediate electrode would be used to affect the transport of electrons across the junction so as to affect conductivity in the diamond layer. Thus, a very fast gated emitter may be possible for direct excitation of an RF cavity.

Diamond has three characteristics which make it an attractive material for high voltage-high power switching: a high thermal conductivity, a large band-gap which makes it less susceptible to thermal runaway, and high dielectric strength. Experimentally, a diamond switch consists of an electron source, an acceleration potential, and a diamond substrate with electrodes. In the so-called linear mode, low energy electrons incident on the surface render the diamond conductive for the time the electron beam is on and the device behaves as an active switch. Thus, in a diamond hybrid emitter, when charge injection occurs at the ferroelectric-diamond interface and increased electron mobility results, a compact diamond switch for high power modulator systems and power electronics is achieved.

In addition to the aforementioned problems with diamond, carbide and semiconductor emitters for display applications, these field emitters systems typically do not result in adequate energy being imparted to the electrons. The result is that specialized phosphors are required for the display systems. This new hybrid emitter will impart significant energy to the electrons because of the strong charge on the surface of the ferroelectric. Thus, although the emitter can be switched with low voltages (<50 V for 50 mm films), significant energy (>5 keV) will be given to the electrons, albeit, at a current lower than the drive current. The need for a specialized phosphor is therefore eliminated.

Changes and modifications in the specifically described embodiments can be carried out without departing from the scope of the invention, which is intended to be limited by the scope of the appended claims.

I claim:

1. A multilayer emitter, comprising:

an actively switchable ferroelectric substrate comprising a ferroelectric output face;

a field emitter fixedly attached to said ferroelectric substrate;

means for switching the polarization of said ferroelectric substrate; and an intermediate exit electrode fixedly attached to said ferroelectric output face between said ferroelectric substrate and said field emitter.

2. The multilayer emitter of claim 1, wherein said ferroelectric substrate comprises an input face, wherein said input face comprises an entrance electrode, wherein said field emitter is fixedly attached to said output face.

3. The multilayer emitter of claim 1, wherein said field emitter comprises diamond.

4. The multilayer emitter of claim 1, wherein said field emitter comprises carbide material.

5. The multilayer emitter of claim 1, wherein said field emitter comprises semiconductor material.

6. The multilayer emitter of claim 1, wherein said means for switching the polarization of said ferroelectric substrate are selected from a group consisting of mechanical switching means, temperature switching means, optical switching means and electrical switching means.

7. The multilayer emitter of claim 1, wherein said diamond is semiconductive.

8. The multilayer emitter of claim 2, further comprising an exit electrode fixedly attached to said field emitter output face.

9. The multilayer emitter of claim 1, wherein said intermediate exit electrode comprises an aperture.

10. The multilayer emitter of claim 8, wherein said exit electrode comprises at least one aperture.

11. The multilayer emitter of claim 6, wherein said mechanical switching means comprise an acoustic source placed in contact with said ferroelectric substrate;

wherein said temperature switching means are selected from a group consisting of a heater and a cooler to induce a temperature change by heating or cooling said ferroelectric substrate across a phase boundary or heating the ferroelectric material from a low temperature to the Curie temperature;

wherein said optical switching means comprise a laser for applying optical energy of sufficient fluence; and wherein said electrical switching means comprise a voltage source electrically connected to said entrance electrode and said exit electrode to provide a sufficiently high electric field to switch said ferroelectric substrate.

12. The multilayer emitter of claim 1, wherein said field emitter comprises diamond oriented in the <111> crystal plane.

13. The multilayer emitter of claim 1, wherein said field emitter comprises diamond and titanium.

14. The multilayer emitter of claim 4, wherein said carbide material is selected from a group consisting of ZrC, HfC and SiC.

15. The multilayer emitter of claim 5, wherein said semiconductor material comprises doped Si.

16. The multilayer emitter of claim 2, wherein said field emitter has a thickness that is defined by the emission properties of said field emitter.

17. The multilayer emitter of claim 2, wherein said ferroelectric substrate and said field emitter each have a thickness defined by the geometry of said entrance electrode and at least one material characteristic selected from a group consisting of ferroelectric material polarization, ferroelectric material permittivity, ferroelectric material electrical breakdown threshold, field emitter permittivity, field emitter emission threshold and field emitter breakdown threshold.

18. The multilayer emitter of claim 2, wherein said ferroelectric substrate and said field emitter each have a thickness defined by the geometry of an exit electrode and at least one material characteristic selected from a group consisting of ferroelectric material polarization, ferroelectric material permittivity, ferroelectric material electrical breakdown threshold, field emitter permittivity, field emitter emission threshold and field emitter breakdown threshold.

* * * * *